United States Patent [19]
Kozak et al.

[11] Patent Number: 5,516,227
[45] Date of Patent: May 14, 1996

[54] SPHERODIZED FLUORESCENT BEADS FOR IMPROVED ROADWAY PAVEMENT MARKER VISIBILITY

[75] Inventors: Edward M. Kozak, Berwyn; Craig S. Bartholomew, Glen Ellyn, both of Ill.

[73] Assignee: IIT Research Institute, Chicago, Ill.

[21] Appl. No.: 271,450

[22] Filed: Jul. 7, 1994

[51] Int. Cl.$^6$ ........................................... E01F 9/00
[52] U.S. Cl. ................... 404/9; 404/14; 501/34; 106/436
[58] Field of Search .................. 404/12, 14; 428/402, 428/406, 407, 328

[56] References Cited

U.S. PATENT DOCUMENTS

| | | | |
|---|---|---|---|
| 3,459,673 | 8/1969 | Best et al. | 252/301.4 |
| 3,506,587 | 4/1970 | Tuner et al. | 252/301.4 |
| 3,522,191 | 7/1970 | Tuner et al. | 252/301.6 |
| 3,527,711 | 9/1970 | Barber et al. | 252/301.4 |
| 3,634,711 | 1/1972 | Barber et al. | 313/92 |
| 3,830,682 | 8/1974 | Rowland | 161/2 |
| 3,996,556 | 12/1976 | Eigenmann | 340/117 |
| 4,080,228 | 3/1978 | Currigan | 156/71 |
| 4,546,042 | 10/1985 | Quon | 428/378 |
| 4,690,958 | 9/1987 | Lacoste et al. | 523/172 |
| 4,737,049 | 4/1988 | Callhan | 404/11 |
| 4,751,148 | 6/1988 | Popma et al. | 428/690 |
| 4,798,681 | 1/1989 | Oversluizen et al. | 252/301.4 |
| 4,798,768 | 1/1989 | Oversluizen et al. | 428/426 |
| 5,237,448 | 8/1993 | Spencer et al. | 119/792 |
| 5,286,682 | 2/1994 | Jacobs et al. | 501/34 |

Primary Examiner—Stephen J. Novosad
Assistant Examiner—Pamela A. O'Connor
Attorney, Agent, or Firm—Fitch, Even, Tabin & Flannery

[57] ABSTRACT

Retroreflective glass or plastic beads have fluorescent properties when irradiated with ultraviolet light and are emplaced in signs in patterns indicative of alphanumeric characters, or embedded in a hot melt comprising road stripes or embedded in the road asphalt or aggregate during construction of the road, to provide effectively bright and clear indications of signs or the extent and direction of the road. The glass beads comprise spherodized soda lime, borosilicate, phosphosilicate or aluminosilicate glasses with low levels of rare-earth dopants mixed therein, such as compounds containing one of the rare earths, or lanthanides. The plastic beads may have fluorescent materials mixed therein, typically organic pigments or dyes based on coumarin and rhodamine or the like.

10 Claims, 4 Drawing Sheets

5,516,227

SPHERODIZED FLUORESCENT BEADS FOR IMPROVED ROADWAY PAVEMENT MARKER VISIBILITY

FIELD OF THE INVENTION

The invention relates generally to road signs, road markers and road stripes which aid visibility during night driving. More particularly, the invention relates to the use of fluorescent materials in combination with retroreflective plastic or glass beads to enhance road sign or road stripe visibility at night even during severe weather.

BACKGROUND OF THE INVENTION

One of the problems faced by an automobile driver at night is the poor visibility of road signs, and also of road stripes, variously called road delineators, delineating stripes, pavement markings and roadway markings. It has long been a goal of governmental and municipal authorities responsible for road safety to make figures and letters on road signs, and road stripes brighter or clearer in the headlights of oncoming traffic. Initially, this has called for using bright paints or reflective surfaces capable of reflecting the light of the headlights of oncoming cars. Paints have been developed which are highly reflective. Such paints usually comprise a titanium dioxide constituent. Unfortunately, the major drawback of such reflective surfaces is, unless the reflective surface is substantially normal to the beams from the headlights of the oncoming car, the vast majority of the impinging light from the headlight beam is deflected or reflected in a direction or directions other than back at the oncoming car.

A further problem occurs when poor night visibility is aggravated by rain, snow or fog. Visible light from headlights backscatters under these conditions, creating glare, so that sign or marker visibility cannot be improved by using brighter headlights.

Other paints have been developed which additionally fluoresce at optical wavelengths when irradiated with optical wavelength light, such as that produced by conventional headlights, and these paints have been used in road signs and road markers. While such signs and markers provide more light for the night driver to see by than a conventional sign or marker, these paints suffer from the drawback that in order to provide a substantial amount of light by fluorescence, it is desirable to increase the light output of impinging auto headlights, which then creates an additional glare hazard for traffic traveling in the opposite direction. As a consequence, such fluorescent paints are preferably used only in situations where oppositely-directed traffic is not in the headlight beam path.

In an effort to circumvent some of these difficulties, sign and marker designers and makers began in the early 1980's to incorporate retroreflective devices in signs and road markers. A retroreflector has the property of reflecting a substantial portion of impinging light back generally in the direction it came from. A typical retroreflector comprises a sphere or bead, typically made of glass or clear plastic. Retroreflection occurs by the tandem action of refraction of the light through the upper surface of the sphere or bead, reflection from the lower inside surface of the sphere or bead, and subsequent refraction of the light as it exits from the upper surface of the sphere or bead, back in the direction from which the impinging light came. A substantial portion of the light is retroreflected, with possibly only nominal losses for some reflection at the upper surface and refraction at the lower surface.

A retroreflector may also comprise a cube corner reflector. In such a retroreflector, the arrangement of three orthogonal, reflective surfaces to form a cubical corner guarantees that light impinging on the concavity is reflected back substantially along a path parallel to the path of the impinging light.

Minute glass particulates have been incorporated into paints to make road lines and road lane delineators brighter at night under headlights. Such particulates, especially in the form of small beads, act in a retroreflective fashion. One such product comprising glass beads having diameters of about 1.5 millimeters is called Visibead, sold by Potters Industries, New Jersey.

Signs have been constructed by stamping large, flat aluminum sheets with a pattern of tiny tetrahedral indentations which form prismatic or cube corner retroreflectors. A thin sheet of colored plastic is adhesively attached over the aluminum sheet to provide a colored sign surface capable of at least some degree of retroreflection.

A drawback of these retroreflective devices is that they still do not adequately overcome the problems created by rain, snow or fog. Backscattering reduces the overall amount of light from headlights before the light even gets to the retroreflector, which is capable of reflecting at best only as much light as impinges thereon. Furthermore, a water layer may form on the surface of retroreflectors during these adverse weather conditions, reflecting a substantial portion of the impinging light in a scattering fashion, thereby diminishing the amount of light which reaches the retroreflector for retroreflection.

Most recently, steps have been taken in Sweden to install road markers which comprise posts having fluorescent properties responsive to ultraviolet wavelengths. These posts are placed at intervals along the side of the road to indicate the curvature of the road. This requires the utilization in Sweden of headlights in cars which emit ultraviolet light. This has the advantage of providing substantial activating energy for fluorescence, while not blinding oppositely-directed traffic, since humans cannot see ultraviolet wavelengths. However, since the posts are emplaced at intervals, they necessarily leave gaps between, and furthermore are subject to obstruction by plants or debris at the roadside. Furthermore, the posts do not provide retroreflection.

There is a need in the industry for a road sign or road marker which provides sufficient light to be safely visible and clear to oncoming traffic during the night, regardless of weather conditions. More particularly, there is a need to utilize as much as possible of impinging headlight energy to provide an adequately bright and clear display or marker, without requiring impractically bright headlights. Such road signs and road markers are preferably able to remain bright and clear even under adverse weather conditions, and furthermore, should be constructed to remain as bright and clear as possible for extended periods of time, so that they do not require frequent replacement or revitalization.

SUMMARY OF THE INVENTION

The present invention comprises devices and articles, and methods for their use, for improving the brightness and clarity of road signs and road markers of various kinds for automobile drivers traveling at night, and in adverse weather. Beads of glass or plastic having fluorescent properties when irradiated with ultraviolet light are disclosed, which may be emplaced in signs in patterns indicative of alphanumeric characters, or embedded in a hot melt of reflective paint comprising road stripes, or embedded in the road asphalt or aggregate during construction of the road, to provide effectively bright and clear indications of sign information or the extent and direction of the road. Furthermore, such glass beads as well as clear plastic beads also operate in a retroreflective fashion to further enhance brightness and clarity by effectively reflecting back in the direction of the oncoming driver substantially all of the impinging light therefrom.

The combined effect of fluorescence and retroreflectivity in spherodized beads according to the present invention provides brighter, clearer road indications than are currently available in the art. Impinging headlight energy is optimally utilized both for reflection substantially back to toward the general direction of the headlights, and independent fluorescence of the bead material. In adverse weather, as when rain water, snow or fog both reduces the amount of headlight energy that reaches the road sign or marker, and also forms a water layer which scatters light without retroreflection, fluorescence in the inventive beads compensates for lost retroreflectivity. The invention is particularly suitable for use where cars have headlights installed which emit both optical and ultraviolet light.

The glass beads may comprise one of a number of suitable glasses, doped with fluorescing material. For example, spherodized soda lime or borosilicate glasses may be used with small concentrations of rare-earth impurities incorporated therein, such as a lanthanide compound. Such glasses are capable of exhibiting a substantial level of fluorescence even after prolonged exposure to ultraviolet radiation.

The plastic beads may have fluorescent materials mixed therein, typically organic pigments or dyes such as coumarin- and xanthene-based compounds.

It is also possible to incorporate organic pigments into glass by use of the "sol-gel" process. In this process, the coumarin and xanthene pigments, modified to contain certain functional groups, are mixed into a silicon-dioxide gel. The gel is cured at elevated temperatures which remove water and harden the glass. The glass can be formed in the shape of an ingot, and once hardened, is subjected to the standard processes used to make glass spheres.

A principal aspect of the invention is to provide fluorescent, retroreflective beads for use in road signs and markers, such as hot melt paint stripes, and in road asphalt or aggregate for brighter and clearer indications for road safety.

Another aspect of the invention is to provide brighter and clearer road signs and markers which are capable of retaining their properties durably, so that they do not require frequent replacement or revitalization.

Still another aspect of the invention is to provide an inexpensive and efficient way of making road signs and markers brighter and clearer for night driving safety.

The above and still further aspects, features and advantages of the invention will become apparent upon consideration of the following detailed description of the preferred embodiments, in conjunction with the accompanying drawings.

BRIEF DESCRIPTION OF THE DRAWINGS

The above and other aspects, features and advantages of the present invention will be more apparent from the following more particular description thereof, presented in conjunction with the following drawings wherein.

DETAILED DESCRIPTION OF THE PREFERRED EMBODIMENTS

The present invention is directed to glass or plastic beads, and road markers, road stripes and signs which incorporate the beads, and which aid visibility during night driving. Glass or plastic having fluorescent properties when exposed to ultraviolet radiation is spherodized to form fluorescent beads which are embedded in road stripes or in the road itself. Alternatively, these beads may be affixed to signs, preferably in conjunction with painted letters, to form alphanumeric patterns.

These beads may also be fixed in adhesive-backed stripes or signs for placement on the backs of vehicles, or as a modification to the triangular warning signs attached to the backs of farm equipment.

The spherodized form is preferably chosen to provide the additional brightness and clarity of retroreflectivity, though other retroreflective shapes are equally employable in the present invention. Light which impinges upon the road stripe, marker or sign of the present invention is substantially retroreflected back toward the source of the light, namely an oncoming car being driven at night, and possible in adverse weather conditions.

Figure 1:
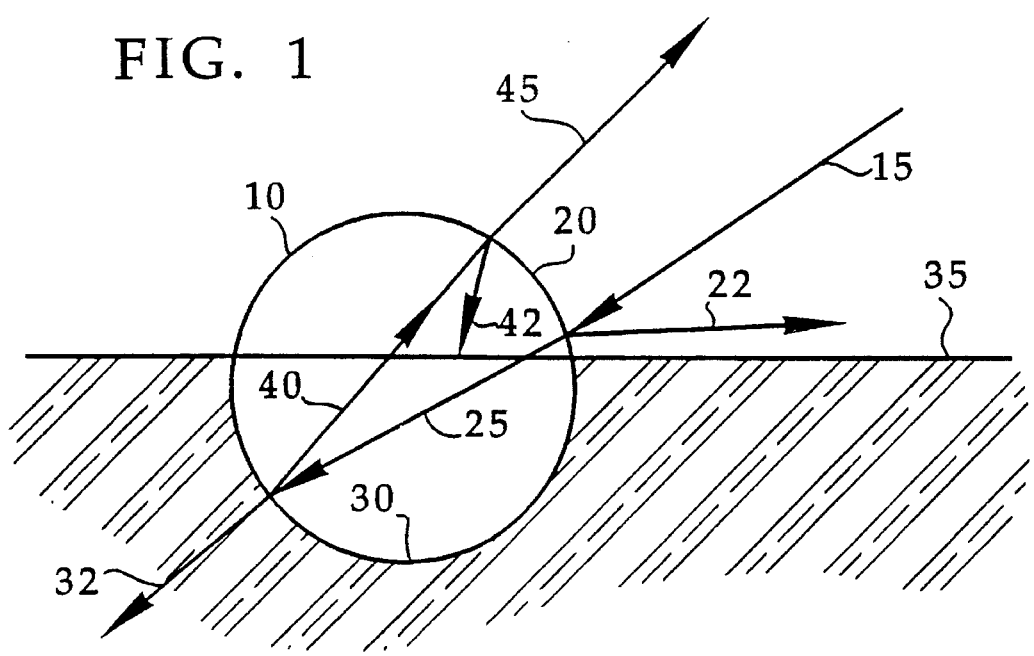
FIG. 1 is a sectional view of a retroreflective bead embodying the present invention, showing the path of light which is retroreflected.

Turning to FIG. 1, a retroreflective sphere 10 is shown in sectional view. Such a sphere may be of glass or clear plastic according to the present invention. Improved retroreflectivity is attained by using a glass having a higher index of refraction. An incident light ray 15 emitted, for example, by the headlight of an oncoming car, is shown intersecting the sphere 10. As the light ray 15 hits the top surface 20 of the sphere, it is refracted according to the refractive index of the glass or plastic relative to the air. Most glasses have a refractive index relative to air of about 1.6. Translucent plastics also have indices of refraction greater than one relative to air. In principle, some of the incident light is reflected from the surface 20 as reflected ray 22, and some is refracted into the retroreflector 10 as refracted ray 25. However, provided the incident ray 15 is not exceedingly oblique to the sphere's surface, a substantial amount of impinging light is refracted. The refracted ray 25 then travels until it strikes the bottom surface 30 of the sphere 10. Again, incident light is partially refracted as refracted ray 32 beyond the bottom surface 30 into whatever medium backs thereon, and partially reflected back into the glass or plastic.

Reflection may be enhanced by providing a reflective coating on the bottom surface 30 of the sphere 10, or embedding the sphere 10 partially or approximately halfway in a medium 35 having a refractive index which provides that most of the light will be reflected back into the glass or plastic. It is contemplated that the beads of the present invention are preferably embedded in highly reflective paints comprising a titanium dioxide constituent, which provide for substantial reflection of the ray 25. However, the beads of the present invention are also significantly retroreflective alone, without any form of backing.

The reflected light ray 40 travels back to the top surface 20, where it is again partly reflected as ray 42 and substantially refracted as ray 45 as it exits the sphere 10. The path of ray 45 resulting from this second refraction is substantially parallel to the incident path 15 of the ray for refractive indices like those of glass or clear plastic.

Figure 2:
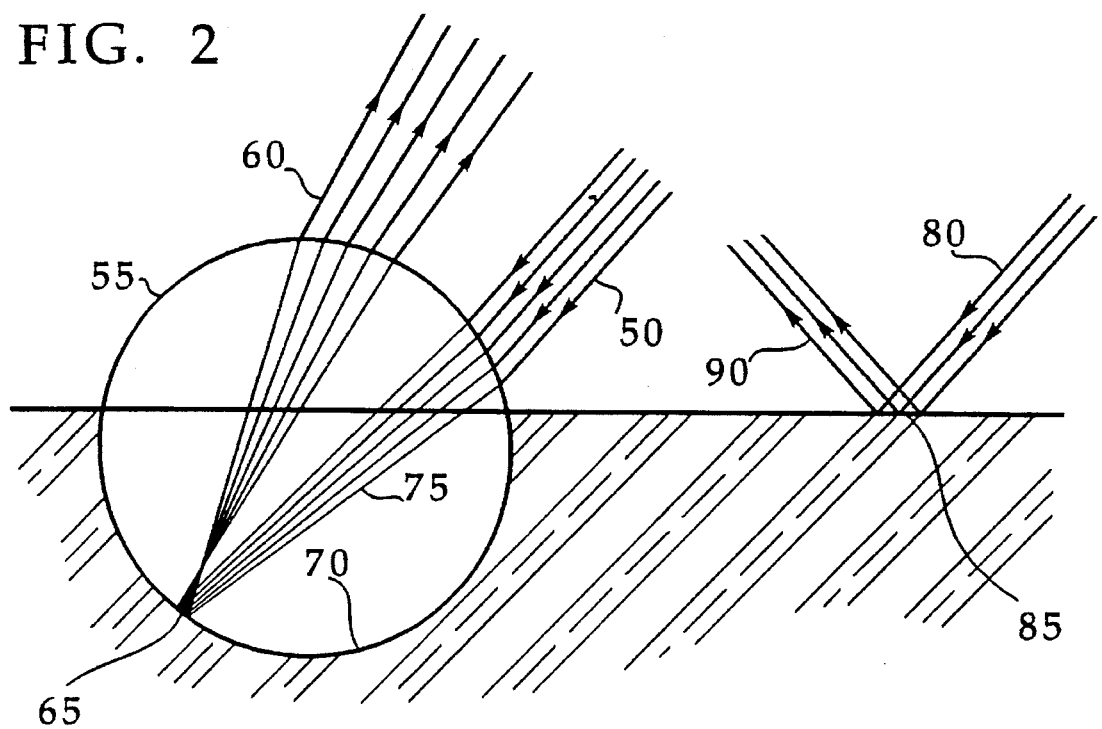
FIG. 2 is a sectional view of a retroreflective bead showing retroreflection generally for a variety of incident light rays, contrasted with mere reflection from a flat surface.

More generally, it can be seen from FIG. 2 that a variety of incident light rays 50 are substantially directed back toward the source of the light by a retroreflective sphere 55. While incident rays 50 are virtually parallel, it can be seen that returning rays 60 are not exactly parallel. Furthermore, it can be seen from the figure that the points of reflection 65 at the bottom surface 70 of the sphere 55 for the incoming refracted rays 75 drifts. Nevertheless, the incident light is predominantly returned in the general direction from which it came. In contrast, light rays 80 obliquely incident on a flat, reflective surface 85 are reflected generally along a path 90 away from the source.

Retroreflection is maximized in an embedded, spherodized bead when the material in which the bead is embedded provides high reflectivity of light. This provides that substantially all of the refracted light incident on the back surface of the bead reflects therefrom, rather than refracting into the embedding layer itself. Furthermore, best results for retroreflection are obtained when the bead is embedded up to at least 50%–60% of its volume in the embedding layer.

Figure 3:
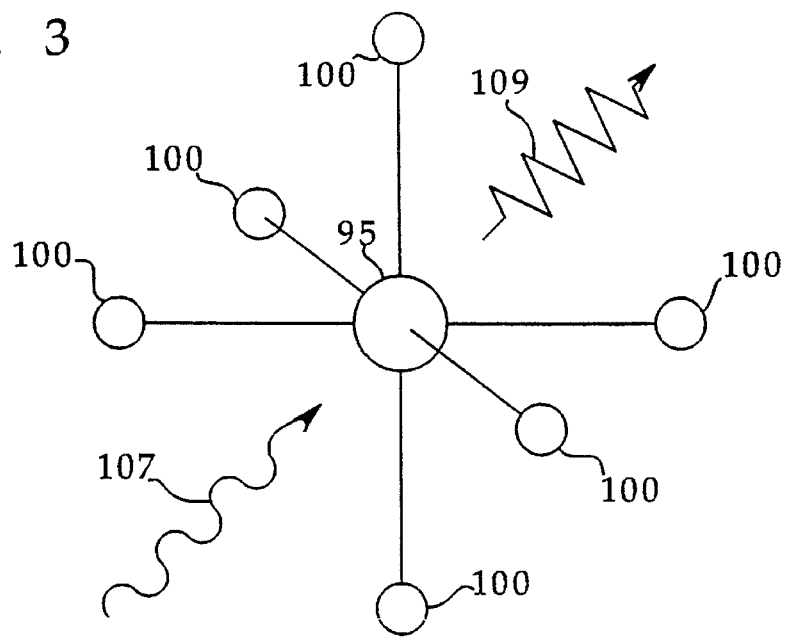
FIG. 3 is a perspective view of a representation of atoms in a lattice or partially ordered glass network of the bead shown in FIG. 1.

Glasses are characterized by an approximately constant separation of nearest-neighbor atoms. Many types of photoluminescent materials depend on the presence of impurity atoms in the place of host atoms in a crystal lattice or in the partially ordered networks having short-range regularity, which networks comprise many glasses. These impurity atoms behave as activators of luminescence by absorbing incoming radiation. Turning to FIG. 3, an impurity atom 95 located between lattice host atoms 100 is separated by a distance 105 from the host atoms. This distance is a function of the electrostatic interactions between the impurity and the host atoms. When an impinging photon 107 is absorbed by the impurity atom, one of its electrons is excited, and the electrostatic energy of the impurity changes. The absorbed energy can be released in three ways: by the vibration of the impurity atom; by the de-excitation of the electron to its initial energy level; or by emission of a photon and a phonon. The first way results in the release of thermal energy. The second way releases a photon of the initial photon's wavelength. The third way results in the emission of light at a wavelength longer than the wavelength of the initial photon, associated with fluorescence.

The change in electrostatic energy causes the host atoms surrounding the impurity to relax to new positions via phonon transition 109, changing the separation distance 105. Subsequent de-excitation of the impurity atom electron results in emission of photons of typically lower frequency since at least part of the energy of the original incident photon has been dissipated in the phonon transition.

A variety of glasses capable of fluorescing under ultraviolet irradiation are suitable for forming the retroreflective glass beads of the present invention. In particular, glasses doped with rare earth compounds are suitable fluorescing glasses for the present invention. More particularly, glasses doped with one or more compounds containing one or more of the following lanthanides are suitable:

Lanthanum—La
Cerium—Ce
Praseodymium—Pr
Neodymium—Nd
Promethium—Pm
Samarium—Sm
Europium—Eu
Gadolinium—Gd
Terbium—Tb
Dysprosium—Dy
Holmium—Ho
Erbium—Er
Thulium—Tm
Ytterbium—Yb
Lutetium—Lu.

By way of example, conventional soda lime, borosilicate, phosphosilicate, aluminosilicate, and aluminoborate glasses are suitable for doping with impurity ions of the aforementioned types. Quartz glasses can also be used.

Glasses for use in the present invention may, for example, comprise approximately 30% to approximately 80% $SiO_2$ or $B_2O_3$, approximately 1% to approximately 35% $La_2O_3$ or $Gd_2O_3$, approximately 5% to approximately 45% $Al_2O_3$ and about 0.5% to about 30% $Tb_2O_3$ or $Ce_2O_3$.

As another example, lanthanide series fluorescence activators can be combined to produce the glass beads of the present invention. A base glass comprising about 76% $SiO_2$, about 2% $Al_2O_3$, about 15% $B_2O_3$, and about 6% $Na_2O$ can be doped with both $Eu_2O_3$ in the range of about 0.20% to about 0.95%, and also $CeO_2$ in the range of about 0.01% to about 0.05%.

A wide variety of glasses may thus be used to form the beads of the present invention, and may be selected based on hardness, workability, cost and other bases.

As is known in the art, lanthanide-series (La—Lu) doping of such glasses provides fluorescent glasses which emit optical wavelengths upon exposure to ultraviolet radiation. A variety of optical wavelengths (colors) can be obtained depending upon the type of impurity used to dope the glass. An advantage of these fluorescent glasses is that the photoluminescing phenomenon takes place at the atomic level, rather than the molecular level. Therefore, no degradation of the luminescence takes place because of molecular bond breakage over time and exposure to energetic ultraviolet rays. Fluorescing beads formed according to the invention are therefore long-lasting.

Preparation of such fluorescing glasses is well known in the art, and a variety of methods may be employed to prepare glasses suitable for use in the present invention. By way of example, as taught in U.S. Pat. No. 3,459,673 to Best et al., the nitrate of lanthanum chloride or lanthanum bromide, or some other water-soluble salt of a rare-earth, dissolved in water at a concentration from about 0.1 g/liter to about 100 g/liter, may be reacted directly with vaporous ultra-pure silicon tetrachloride to yield a hydrated silica, silicic acid. Preferably stoichiometrically excess water is used in the aqueous solution of the rare-earth salt. Silicic acid polymerizes over time to form a gel, exchanging rare earth cations with the aqueous solution. Distilled water is then added to the gel to complete hydration. Subsequently, the doped silica is dehydrated by heated evaporation at about 100° C. The dried silica is then fused by firing at red heat and according to the present invention formed into spherodized beads of substantial retroreflectivity.

An alternative example for preparation of fluorescing glass is taught in U.S. Pat. No. 3,527,711 to Barber et al. Finely divided, non-crystalline, pure silica is compacted and then combined with a small effective amount of lanthanum oxide or other rare earth oxide. The mixture is heated under a vacuum at an elevated, non-devitrifying temperature for a time sufficient to achieve coalescence thereof. According to the invention, the mixture can be separated into chunks which, when so heated, form the beads of the present invention.

Of course, other methods known in the art may be used to prepare fluorescing glass, and other rare earths besides those mentioned in the above preparation examples are suitable to obtain the fluorescence desired for the present invention. Furthermore, quartz or other transparent crystalline substances doped with rare earths, and thus capable of fluorescing under ultra violet irradiation may also be used in the invention. A wide variety of suitable glasses is readily available from glass suppliers such as Kigre, Inc., of Hilton Heads, S.C., which then only need to be melted and formed into spherodized beads.

A wide variety of well known plastics may be used to form spherodized beads which fluoresce at optical wavelengths upon exposure to ultraviolet radiation. Fluorescence is achieved simply by mixing a suitable organic pigment such as a coumarin- or xanthene-based fluorescing compound, by way of example, into the plastic resin prior to setting. Pure-dye fluorescent additives are widely available in the plastics industry, from such as Day-Glo Color Corp., of Cleveland, Ohio, or Americhem, Inc., of Cuyahoga Falls, Ohio. Such dyes may be used in resins such as polycarbonate, polystyrene and vinyl. Formation of plastics into spherodized beads can be achieved by injection molding, among other well known methods of shaping plastic into specified forms.

When it is desirable to make the plastic beads also behave as retroreflectors, similar to the aforementioned glass beads, a clear plastic matrix should be chosen from which to form the beads, such as polyethylene or polystyrene resins.

In the art, road stripes are applied according to strict specifications as to hardness, wear resistance, abrasiveness, binder resin cure-time, etc., and require specific thermoplastic compounds with pigments and filler being well dispersed in the binder resin. Road striping is accomplished by using a hot-melt process in which the road pavement is pre-heated prior to application of resinous material containing the pigment, filler, and other required additives. Special kettles and applicators must be provided for heating, melting and applying the molten thermoplastic material. Typically, the mixture is kept at 1,000 degrees Fahrenheit or more prior to application. While the melt typically comprises highly reflective components, usually titanium dioxide, it is also desirable to make these stripes fluorescent. However, addition of fluorescent pigments or dyes to the hot melt does not achieve a successful result. Pigments or dyes used on public roads must meet environmental and safety criteria, and furthermore should be reasonably inexpensive because of the extensive areas to be covered. Only certain fluorescing organic compounds meet these criteria, but such compounds cannot survive the intense and prolonged heating in the kettle. It is therefore impracticable to combine these fluorescing compounds with the hot melt in the kettle during production of road lane delineating markers and the like.

Figure 4:
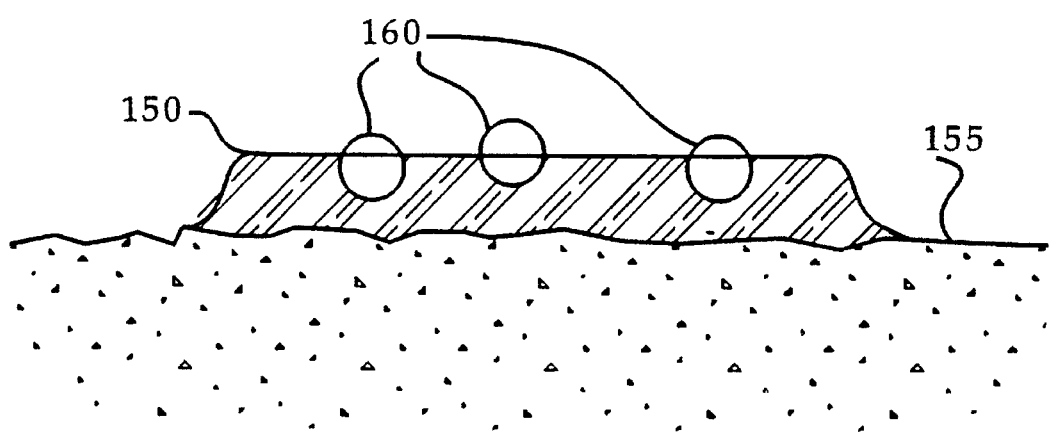
FIG. 4 is a sectional view of a road lane marker of the present invention.

Accordingly, turning to FIG. 4, one embodiment of the invention is shown to comprise a road lane delineating stripe 150, shown in cross section, laid down on the road surface 155, and contemplates that as the hot melt is laid down to form road stripe 150, spherodized glass or plastic beads 160 such as described above in conjunction with FIG. 1 according to the invention are dropped and pressed into the cooling stripe after it has been applied to the road surface, thereby becoming partially embedded. The beads are thus not subjected to the extreme temperatures of the kettle. The beads may be distributed fairly densely across the area of the stripe 150 to achieve a substantially uniform fluorescence when irradiated with ultraviolet light. The beads are preferably about two millimeters in diameter, and should be embedded up to 50–60% of their volume to permit adequate retroreflectivity, while avoiding being dislodged by the wheels of passing vehicles. Thus, a typical rectangular road lane delineating stripe having dimensions of four inches by eighteen inches could be substantially covered with approximately 1900 such beads.

A less dense covering of beads 160 may be preferable to limit costs while still achieving the same general appearance at a distance. For example, the stripe 150 may be covered over 30% of its area by embedded beads. From a distance as a car approaches, the entire surface of the stripe 150 will appear both to fluoresce and also reflect the light from the headlights. With the use of headlights which give off both ultraviolet and optical light, the brightness and clarity of the stripe 150 will be dramatically improved over the state of the art by the combination of retroreflection of the optical light and fluorescence by ultraviolet excitation. Furthermore, since it is contemplated the invention will be used where headlights may be installed in cars which give off both optical and ultraviolet light, excessively bright headlights are not required, so that oppositely-directed traffic will not be blinded.

Figure 5:
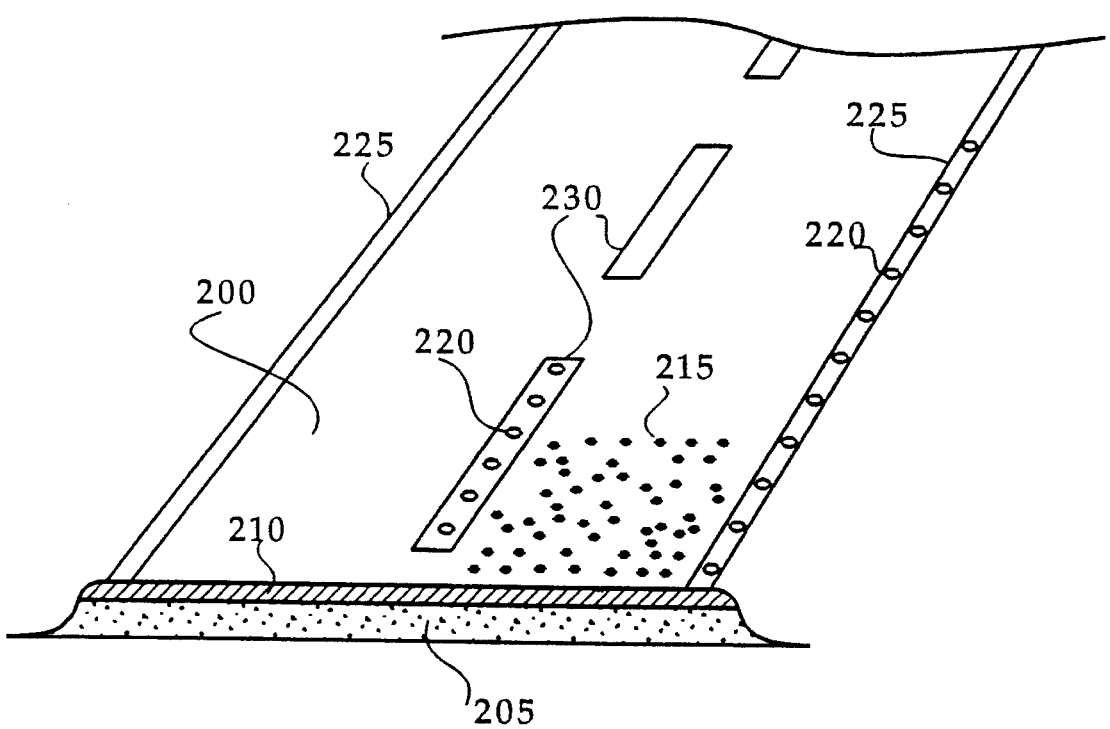
FIG. 5 is a top perspective view of a section of road employing several embodiments of the present invention.

As depicted in FIG. 5, glass or plastic beads of the present invention may be emplaced in a variety of surfaces on a road to enhance traffic safety at night. A road 200 may be composed of a supporting underlayer 205 of rough material, rock, cement or the like, over which is laid a top layer 210 of finer aggregate, cement or asphalt. According to an embodiment of the present invention, glass or plastic beads as described above may be deposited in the aggregate layer 210 at the time that layer is deposited on underlayer 205. The beads 215 lie partially embedded in the aggregate of layer 210, and become fixed in place as the layer 210 solidifies or cools, depending on the method employed to create the layer 210. Methods for laying roads are well known in the art, and need not be modified to accommodate the post-laying step of pressing the inventive beads into the surface. Such beads 215 may be both fluorescent and retroreflective. They should be uniformly distributed in the aggregate, though it is not necessary that they densely cover the entire surface of the road 200. The beads 215 should be small, preferably as small as about two millimeters in diameter, and are preferably embedded up to 50–60% of the volume of each bead.

Alternatively, another embodiment of the invention utilizes beads 220 as described in conjunction with FIG. 1, in road edge marker lines 225. The beads 220 may be glass or plastic, and are both fluorescent and retroreflective as described above. Beads emplaced in such marker lines 225 may be emplaced similarly to the emplacement of beads in road stripes as described above: the beads are dropped and pressed into freshly laid hot melt from a kettle, to become firmly embedded, preferably up to 50–60% of their volume, as the melt cools to form the line.

The beads 220 may also be formed with larger diameters, up to about one inch in diameter, and emplaced at frequent, regular intervals along the marker line 225, instead of substantially covering it. Larger-diameter beads 220 may also be emplaced in road stripes 230, such that four or five such larger beads are equally spaced along the length of a single stripe 230. Such larger-diameter beads are similar to the large reflectors presently employed in the art in such marker lines and road stripes, but have the advantage of both fluorescing and retroreflecting under illumination of mixed optical/ultraviolet producing headlights.

When larger-diameter beads are used, it may be necessary to facilitate the emplacement of each bead by forming a well or depression into which the bead may be adhesively fixed, rather than simply dropping or pressing the beads into a hot melt, as may be done with the emplacement of smaller-diameter beads as described above. A depression may be created in the underlying asphalt, over which the hot melt may be applied. As the melt cools, the bead is dropped into the depression, and becomes fixed in place upon cooling of the resin of the melt.

Figure 6:
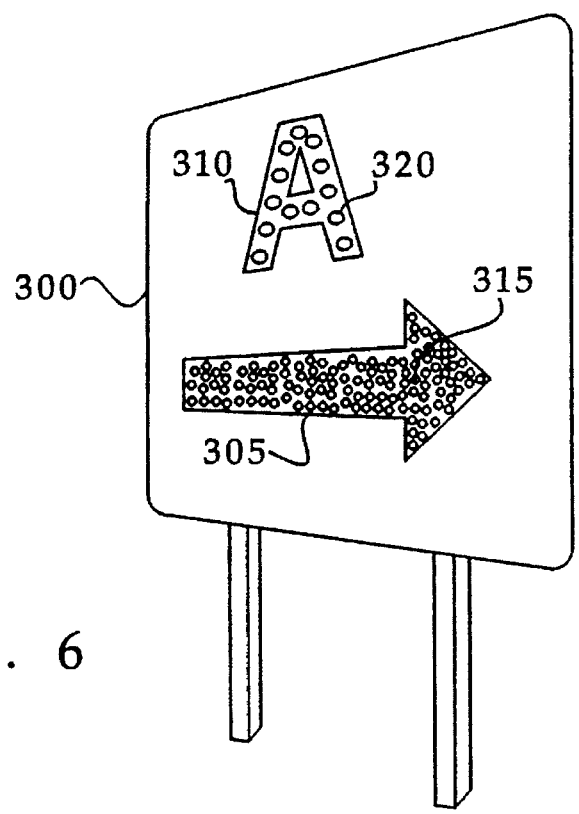
FIG. 6 is a perspective view of a road sign embodying the present invention.

A further embodiment of the present invention contemplates the use of retroreflective, fluorescing beads of glass or plastic in road signs, as shown in FIG. 6. A sign 300 may have on it both symbols, such as an arrow 305, and letters 310. Beads 315 of the present invention may be affixed to an area describing a symbol such as arrow 305 to make the symbol particularly clear at night, even under adverse weather conditions. Alternatively, inventive beads 320 may be affixed at frequent, regular intervals in the pattern of alphanumeric letters 310.

Several ways of making such a sign are contemplated. An aluminum sheet forming the sign 300 may be stamped with hemispherical indentations about one inch in diameter, to accommodate beads 320 in the pattern of alphanumeric information 310 to be displayed on the sign 300. The stamped aluminum sheet surface is painted with appropriate colors as presently performed in the art, including highly reflective white paints or resins containing a titanium dioxide constituent, over regions defining alphanumeric or symbolic information, 310 and 305, respectively. Thereafter, beads 320 according to the invention, having about one-inch diameters, are fixed adhesively in the wells created by the hemispherical indentations.

Where beads 315, having diameters of about 2 millimeters or smaller, are used to substantially define the shape of alphanumeric or symbolic information displayed on the sign 300, the aluminum sheet need not be stamped. The sheet is layered with appropriate paints or resins as known in the art, and the beads 315 may be pressed into the paint or resin layer, to become fixed there as the layer dries.

Figure 7:
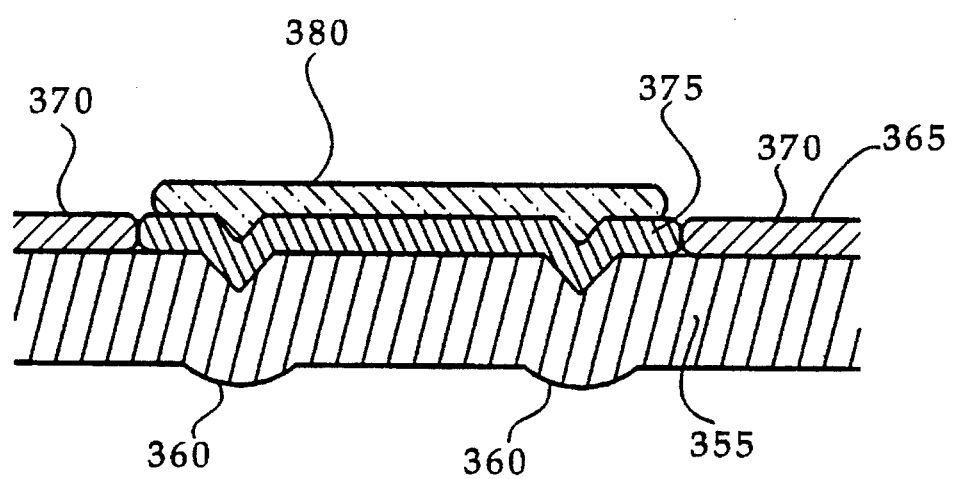
FIG. 7 is a sectional view of a road sign embodying the present invention.

In an alternative sign embodiment of the present invention, as shown in FIG. 7, a sign 350 is constructed by stamping a flat aluminum sheet 355 with many small tetrahedral indentations 360, as is done in the prior art. The indentations may measure in the range of about one millimeter to about one centimeter along a side. Such tetrahedral indentations 360 serve as cube-corner retroreflectors for light incident on the upper side 365 of the sign 350. A layer of colored paint or resin may be applied to the information bearing side 365, to define alphanumeric or symbolic information. In place of paint or resin, a thin foil of colored plastic may be adhesively applied, as known in the art. One colored layer 370 of paint, resin or plastic may define an area which appears as the background to the sign information, while another layer 375 may define the alphanumeric or symbolic area, where the indentations 360 have been stamped. Alternatively, the background layer may be applied over the entire surface of the sign 350, and the alphanumeric or symbolic layer may be applied over the background layer. The layers 370 and 375 should be highly reflective, bright, contrasting colors, such as white on green, as seen in many road signs presently, and furthermore should follow the contours of the indentations 360, to preserve the cube-corner retroreflectivity of the indentations.

According to the invention, a layer 380 of glass or plastic capable of fluorescing under ultraviolet light, as described above, may be applied as described below over the information bearing side of the sign 350. The glass or plastic 380 may be applied on top of said layer 375 to define alphanumeric information on side 365, while not extending to cover other background areas of the sign surface.

The resulting sign has the advantage over signs in the prior art of providing both retroreflection under headlight illumination, and luminescence under ultraviolet irradiation from either headlights or an ultraviolet lamp directed at the sign surface. The added brightness and clarity from the luminescing glass overcomes the failure of the prior art signs to sufficiently retroreflect under adverse weather conditions.

Furthermore, because the fluorescent glasses suitable for use with the present invention include a variety of luminescing colors, it is contemplated in the present invention that alphanumeric information on a sign may be formed from glass of one luminescing color, while the remaining surface area of the sign may be covered by a layer of glass luminescing in another color. Alternatively, just the surface areas defining the alphanumeric information may be covered with a layer of such glass.

The application of a glass layer in this fashion can be performed by any of a number of well known methods in the art. Molten glass may be poured into molds on the sign surface, however, a particularly suitable method of applying the glass is by means of rf-sputtering.

The beads of the present invention may also be employed advantageously in other applications related to night visibility. For example, beads according to the invention may be affixed adhesively or deposited on an adhesive layer shaped so as to define the letters of a license plate. Clear beads as small as one millimeter in diameter may comprise a layer of beads partially embedded in adhesive or paint, over the areas describing the alphanumeric letters appearing on a license plate. During the day, such a license plate appears to have alphanumeric letters in one color, on a contrasting background. At night, however, when illumination is inadequate to bring forth the contrast between the background and the letters, the beads fluoresce and retroreflect under the combination of ultraviolet and optical light from the headlights of other cars. An ultraviolet lamp mounted on the car directly adjacent the license plate may also serve to present the license plate information clearly at night, regardless of weather conditions.

The beads of the present invention may also be employed, for example, on the flight deck of an aircraft carrier to aid pilots in landings in adverse weather when covertness of the operation is mandatory, and the deck cannot be illuminated.

While the invention herein disclosed has been described by means of specific embodiments and applications thereof, numerous modifications and variations could be made thereto by those skilled in the art without departing from the scope of the invention set forth in the claims.

What is claimed is:

1. An optically transparent bead for enhancing the brightness of road markings and signs, having a substantially spherical shape for substantially retroreflecting incident light of optical wavelengths, and comprising a glass; and an oxide dopant of at least one of the lanthanide series of the elements at an effective concentration to activate substantial fluorescence in the glass under illumination with ultraviolet light.

2. An optically transparent bead according to claim 1, wherein said glass bead with lanthanide oxide dopant is substantially free of tint under illumination with optical wavelengths.

3. An optically transparent bead according to claim 1, wherein the lanthanide element of said lanthanide oxide dopant is in a trivalent state.

4. An optically transparent bead according to claim 3, comprising at least one of the set of $La_2O_3$, $Ce_2O_3$, $Eu_2O_3$, $Gd_2O_3$, or $Tb_2O_3$.

5. An optically transparent bead according to claim 4, comprising a coating of material having high reflectivity at visible wavelengths, substantially covering approximately a hemisphere of said bead.

6. An optically transparent bead according to claim 4, wherein said bead has a refractive index relative to air greater than 1.6.

7. An optically transparent bead according to claim 4, comprising approximately 30% to approximately 80% of one of the set of $SiO_2$ and $B_2O_3$; approximately 1% to approximately 35% of one of the set of $La_2O_3$ and $Gd_2O_3$; approximately 5% to approximately 45% $Al_2O_3$; and about 0.5% to about 30% of one of the set of $Tb_2O_3$ and $Ce_2O_3$, where percentages are percentages-by-weight.

8. An optically transparent bead according to claim 1, comprising about 76% $SiO_2$; about 2% $Al_2O_3$; about 15% $B_2O_3$; about 6% $Na_2O$; about 0.20% to about 0.95% $Eu_2O_3$; and about 0.01% to about 0.05% $CeO_2$, where percentages are percentages-by-weight.

9. An optically transparent bead according to claim 1, comprising a coating of material having high reflectivity at visible wavelengths, substantially covering approximately a hemisphere of said bead.

10. An optically transparent bead according to claim 1, wherein said bead has a refractive index relative to air greater than 1.6.

* * * * *

UNITED STATES PATENT AND TRADEMARK OFFICE
CERTIFICATE OF CORRECTION

PATENT NO. : 5,516,227
DATED : May 14, 1996
INVENTOR(S) : Edward M. Kozak and Craig S. Bartholomew It is certified that error appears in the above-indentified patent and that said Letters Patent is hereby corrected as shown below:

Column 1, after the title of the patent, insert the following paragraph:

--This invention was made with government support under Contract No. DTFH61-92-C-00027 awarded by the United States Department of Transportation. The government has certain rights in this invention.--

Signed and Sealed this

Fourth Day of November, 1997

Attest:

BRUCE LEHMAN

Attesting Officer    Commissioner of Patents and Trademarks